United States Patent Office 3,124,921
Patented Mar. 17, 1964

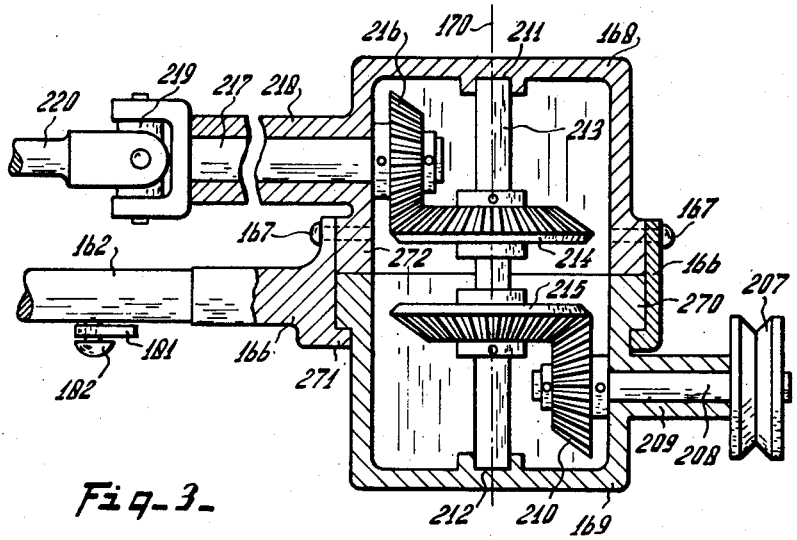
Fig-3-
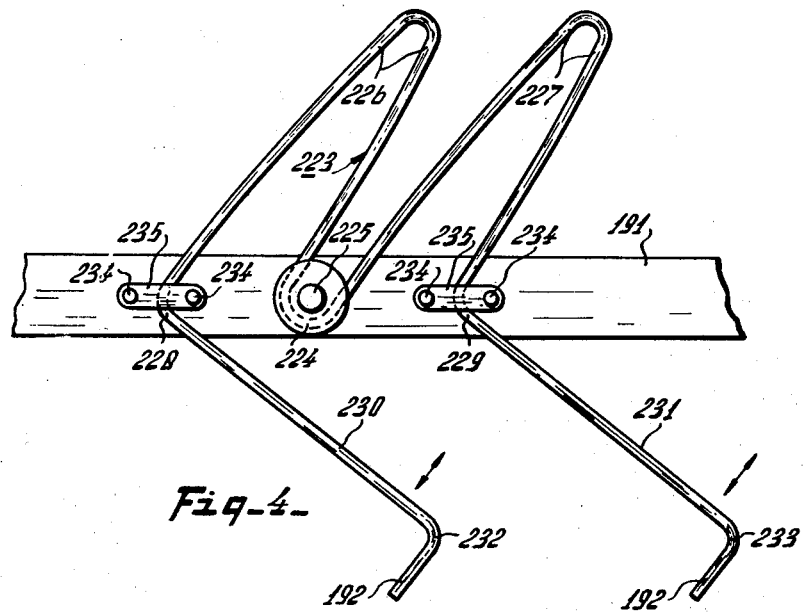
Fig-4-

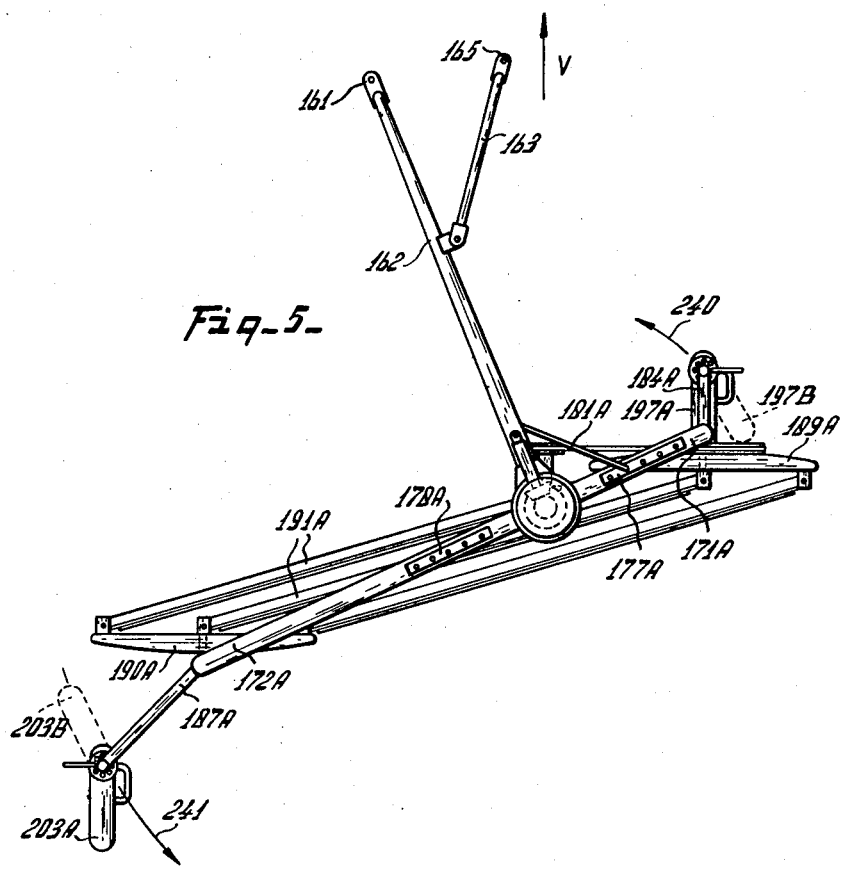

3,124,921
DEVICE FOR THE LATERAL DISPLACEMENT OF CROP LYING ON THE GROUND
Cornelis van der Lely, Zug, Switzerland, and Ary van der Lely, Maasland, Netherlands, assignors to C. van der Lely N.V., Maasland, Netherlands, a Dutch limited company
Original application Jan. 26, 1955, Ser. No. 484,165, now Patent No. 2,939,265, dated June 7, 1960. Divided and this application June 7, 1960, Ser. No. 34,566
Claims priority, application Netherlands Jan. 29, 1954
5 Claims. (Cl. 56—377)

This invention relates to devices for the lateral displacement of crop lying on the ground.

This application is a divisional of application Serial No. 484,165, filed January 26, 1955 (now Patent No. 2,939,265).

This invention relates more particularly to apparatus of the type comprising a frame, raking members mounted on said frame, means for driving said raking members, draw means coupled to said frame by vertical hinge means, and locking means for locking the draw means in different positions with regard to the frame, such that in a first working position of the device one side of the raking members is in contact with the crop and in a second working position the other side of the raking members is in contact with the crop.

It is an advantage of such a device that the raking members can rotate in both working positions in the same direction.

The invention further relates to a device for laterally displacing crop lying on the ground and comprising a number of raking beams, rotatable supports obliquely disposed with regard to the travelling direction, a frame with at least one rotatable raking mechanism constituted by said number of raking beams adapted to move parallel to themselves, said beams being provided with catching members and having their corresponding extremities connected to said rotatable supports, said supports being rotatably mounted on the frame, said frame lying mainly above the rotatable raking mechanism. By means of such a device, a simple frame can be obtained while the displacement of the crop will not be hindered by the frame.

The invention will next be explained in greater detail with reference to the accompanying drawing in which:

FIGURE 3 is a section on an enlarged scale of a detail of the device according to FIGURES 1 and 2;

FIGURE 4 is a side elevation on an enlarged scale of raking teeth and their attachment in said device;

FIGURE 5 shows the device according to FIGURES 1 to 4 in plan view and in a modified position in which the device works as a tedder.

Figure 1:
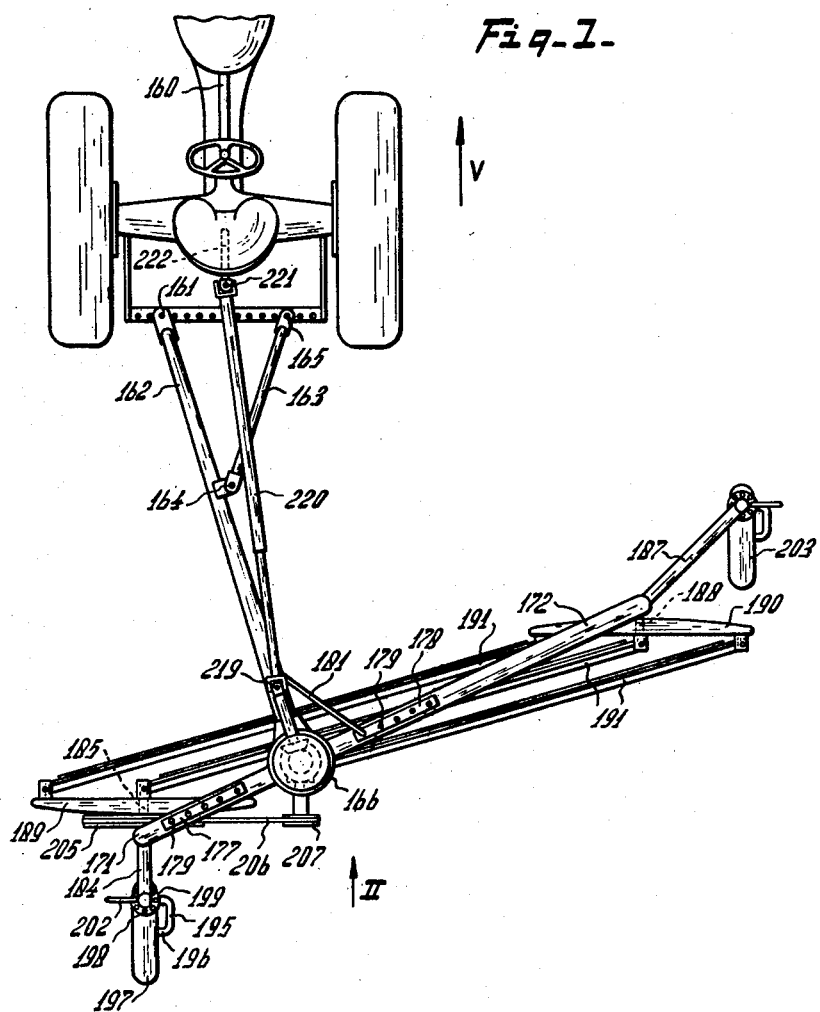
FIG. 1 is a plan view of a device provided in accordance with a preferred embodiment of the invention.
Figure 2:
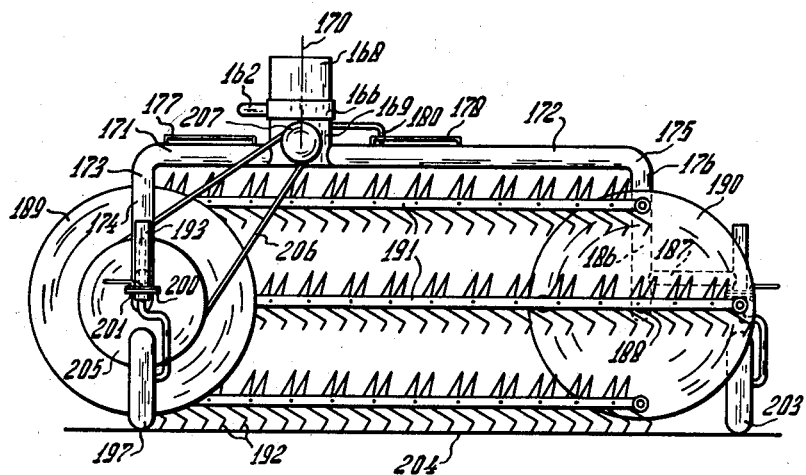
FIGURE 2 shows this device in elevation, viewed in the direction of the arrow II in FIGURE 2.

According to FIGS. 1 and 2 at a point 161 of a tractor 160 is secured one end of a draw arm 162. A bracing bar 163 is connected at 164 to the draw arm 162 and at 165 to the tractor. The other end of the draw arm 162 carries a horizontal ring 166 (see also FIG. 3) which is fixed by means of bolts 167 to a cup 168. A second cup 169 has a collar 270 accommodated between an edge 271 of the ring 166 and the lower edge 272 of the cup 168, so that the cup 169 and the cup 168 can only rotate with regard to each other about a vertical axis 170.

Connected to the cup 169 is a frame comprising two aligned horizontal tubes 171 and 172 constituting a frame beam. The tube 171 is downwardly bent at 173 into a vertical tube 174 and the tube 172 is downwardly bent at 175 into a vertical tube 176. The tubes 171 and 172 are provided on their respective upper sides with a strip 177 and 178. These strips are each provided with a number of holes 179. Through one of these holes passes the downwardly bent extremity 180 of a bracing bar 181; the other extremity of said bar 181 is secured to the draw arm 162 by means of a pin 182 passing through a hole in the bar (see FIG. 3).

At 183, a horizontal arm 184 is fixed to the tube 174 and the lower end of the tube 174 is bent to form a horizontal shaft 185. In the same manner, to the tube 176 is fixed at 186 a horizontal arm 187, and the lower end of the tube 176 is belt to form a horizontal shaft 188. Upon the shafts 185 and 188, beam carrying supports or spiders 189 and 190 are rotatably mounted. Said supports carry together raking member comprising four beams or bars 191 which are each provided with teeth 192.

The horizontal arm 184 carries at its free end a vertical hollow bar 193 constituting a bearing for a vertical axle 194 rigidly connected by means of an arm 195 to the horizontal axle 196 of a running wheel 197.

The bar 193 carries at its lower end a ring 199 provided with holes 198. Against the under side of the ring 199 bears a ring 200 fixed to the axle 194 and provided with a hole 201. A locking pin 202 can pass through a hole 198 and the hole 201 in order to lock the axle 196 with respect to the frame formed by the tubes 174, 171, 172 and 176. The horizontal arm 187 is provided with a running wheel 203 in exactly the same manner. The running wheels 197 and 203 rest upon the ground 204 and support the device in such a manner that the teeth 192 of a beam 191 in its lowermost position will lightly touch the ground.

Rigidly fixed to the beam carrying support 189 is a driven means including rope pulley 205, so that both members can rotate jointly about the shaft 185. An endless rope or belt 206 couples the pulley 205 with a rope pulley 207. The latter is secured to a horizontal shaft 208 which is mounted in a bearing 209 integral with the cup 169 and carries within said cup a bevel gear wheel 210.

Within the cups 168 and 169 are formed driving means including bearings 211 and 212 for the ends of a vertical shaft 213 carrying two bevel gear wheels 214 and 215. The lowermost wheel 215 meshes with the gear wheel 210 and the wheel 214 meshes with a bevel gear wheel 216 fixed upon a shaft 217. The shaft 217 is mounted in a bushing 218 which is integral with the cup 168. Outside the cup 168 the shaft 217 is connected by means of a universal joint 219 to a telescopic shaft 220 which is coupled by means of a second universal joint 221 with the power takeoff 222 of the tractor 160.

The device is used as follows: The tractor 160 is driven in the direction of the arrow V over the land with the running wheels 197 and 203 locked in the position shown in FIG. 1, if desired, by means of the locking pins, such as the pin 202. The power take-off 222 drives the shafts 220 and 217 so that through the gear wheels 216 and 214 the shaft 213 will be rotated. Through the gear wheels 215 and 210, the shaft 213 drives the shaft 208 with the pulley 207. Through the rope 206, the pulley 205 and the beam carrying support 189 will be rotated.

The beams 191 act as coupling rods, by which the beam carrying support 190 will also be rotated. The power take-off shaft rotates in such direction that always the lowermost of the beams 191 will move to the left.

The device then operates as a rake delivering to the left. However, it is also possible to rotate the power take-off shaft in the opposite direction, in which case the device operates as a tedder.

In order to insure that the teeth will exactly follow the ground upon movement in the one or in the other direction, the teeth 192 are fixed to the beams 191 in the manner shown in FIG. 4.

Every pair of teeth 192 is formed by the extremities of a steel wire 223, the double-bent middle 224 of which is clamped to the beam 191 by means of a bolt 225. The generally parallel parts 226 and 227 of the wire adjacent to the middle 224 are bent in U-shape. The remaining ends of the wire 223 are bent at right angles at 228 and 229 and constitute supporting members or extensions 230 and 231, said members being bent at right angles at 232 and 233 to form a pair of teeth 192.

The parts of the steel wire 223 at 228 and 229 are each located with clearance between two pins 234 and at the same time with a small clearance between the beam 191 and a strip 235 which is held at a distance from the beam 191 by the pins 234. All parts of the steel wire 223 are located in a vertical plane. The advantage of this construction is that the raking action of the teeth is equally favorable in both directions. Moreover the teeth 192 are able to move upwards in the plane of the wire 223 and all parts of the wire can bend in said plane without being obstructed by the pins 234.

By reversing the direction of rotation of the power take-off shaft the device will operate as a tedder. In many cases, this reversal would necessitate special precautions at the tractor. In the device shown in FIGS. 1–3, there is, however, a possibility which is preferred to the reversal of the direction of rotation of the power take-off shaft. The frame with the tubes 171 and 172 and the supports 189 and 190 may be rotated through 180° about the axis 170, as the result of which the device assumes the position shown in FIG. 5, wherein the parts which have changed their place have been indicated by the same reference numerals as in FIGS. 1–3, with the addition of the letter A. Without changing the direction of rotation of the power take-off shaft, the beams 191A will now move to the right in their lowermost position, so that the device operates as a tedder. The advantage is obtained that the arrangement of the teeth does not have to be symmetrical with regard to a vertical plane parallel to the beam in question, since the teeth always act in the same direction. Thus, an asymmetrical arrangement of the teeth may be adopted.

The transformation of the device from the position according to FIG. 1 into the position according to FIG. 5 is effected in the simplest manner by locking the running wheels with regard to the frame temporarily in the position 203B and 197B by means of the locking pins, such as the pin 202. In this position, the extensions of the axes of the wheel axles intersect the vertical axis 170 of the draw arm, so that, when the bar 181 has been disengaged, the frame can be easily turned about the axis 171, while the running wheels roll over the ground in the direction of the axes 240 and 241. In the new position, the running wheels are again made self-adjusting or locked in a suitable position and the bar 181 is also fixed.

Figure 6:
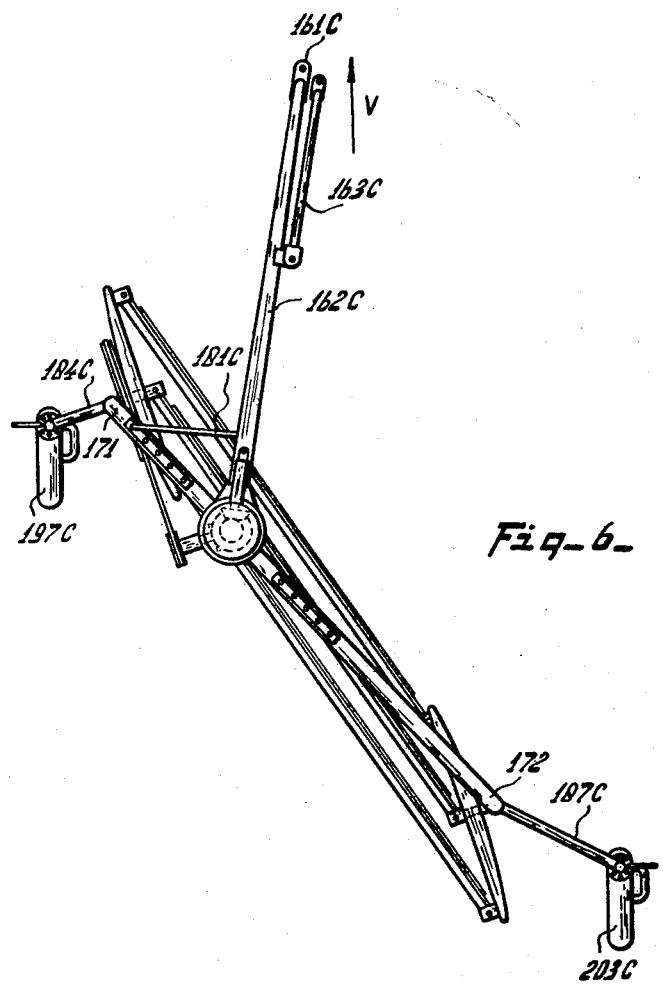
FIGURE 6 is a plan view of the device according to FIGURES 1 to 5 in a position in which the device can be easily transported.

When the device is to be transported, the presentation of a large width in the direction of travel is disadvantageous. To avoid this, the device can be brought to the position shown in FIG. 6. In this position the parts in question of the device have been indicated by the same reference numerals as in FIG. 1, but the letter C has been added. Preferably the running wheel 203C is locked in the illustrated position, whereas the running wheel 197C is kept self-adjusting, the device being fixed to a tractor merely at the point 161C.

What we claim is:

1. A device adapted for connection to a tractor having a normal forward direction of movement and further adapted for the lateral displacement of crop lying on the ground, said device comprising a frame, means connected to said frame and adapted to connect the same to said tractor in trailing relationship, spaced rotatable means on said frame rotatable in planes substantially transverse of said direction and on axes substantially parallel to said direction, horizontal bars extending between said rotatable means and pivotally connected to the latter, the first said means including driving means adapted for being coupled to said tractor, driven means coupled to one of said rotatable means in trailing relationship thereto, said driven means being coupled to and driven by said driving means, and raking elements on said bars.

2. A device as claimed in claim 1 wherein said driven means comprises a belt and pulley in operative association with each other and with said one rotatable means.

3. A device as claimed in claim 1 wherein the first said means supports said frame for rotation on a vertical axis, including locking means for locking the frame in a fixed position.

4. A device as claimed in claim 1 comprising ground wheels on said frame, means supporting said wheels for adjustment about vertical axes, the last said means including means to lock said wheels in fixed positions.

5. A device as claimed in claim 1 wherein the first said means comprises a draw arm coupled to said frame and a bracing bar between said draw arm and frame to fix the geometrical relationship thereof.

References Cited in the file of this patent

UNITED STATES PATENTS

| | | |
|---|---|---|
| 960,950 | Keeser | June 7, 1910 |
| 1,195,172 | Bamford et al. | Aug. 22, 1916 |
| 2,618,921 | Riley et al. | Nov. 25, 1952 |

FOREIGN PATENTS

| | | |
|---|---|---|
| 169,958 | Austria | Dec. 27, 1951 |
| 675,045 | Great Britain | July 2, 1952 |
| 233,116 | Switzerland | Oct. 2, 1944 |